(Model.)
F. T. DAVIS.
SASH FASTENER.
No. 331,041. Patented Nov. 24, 1885.
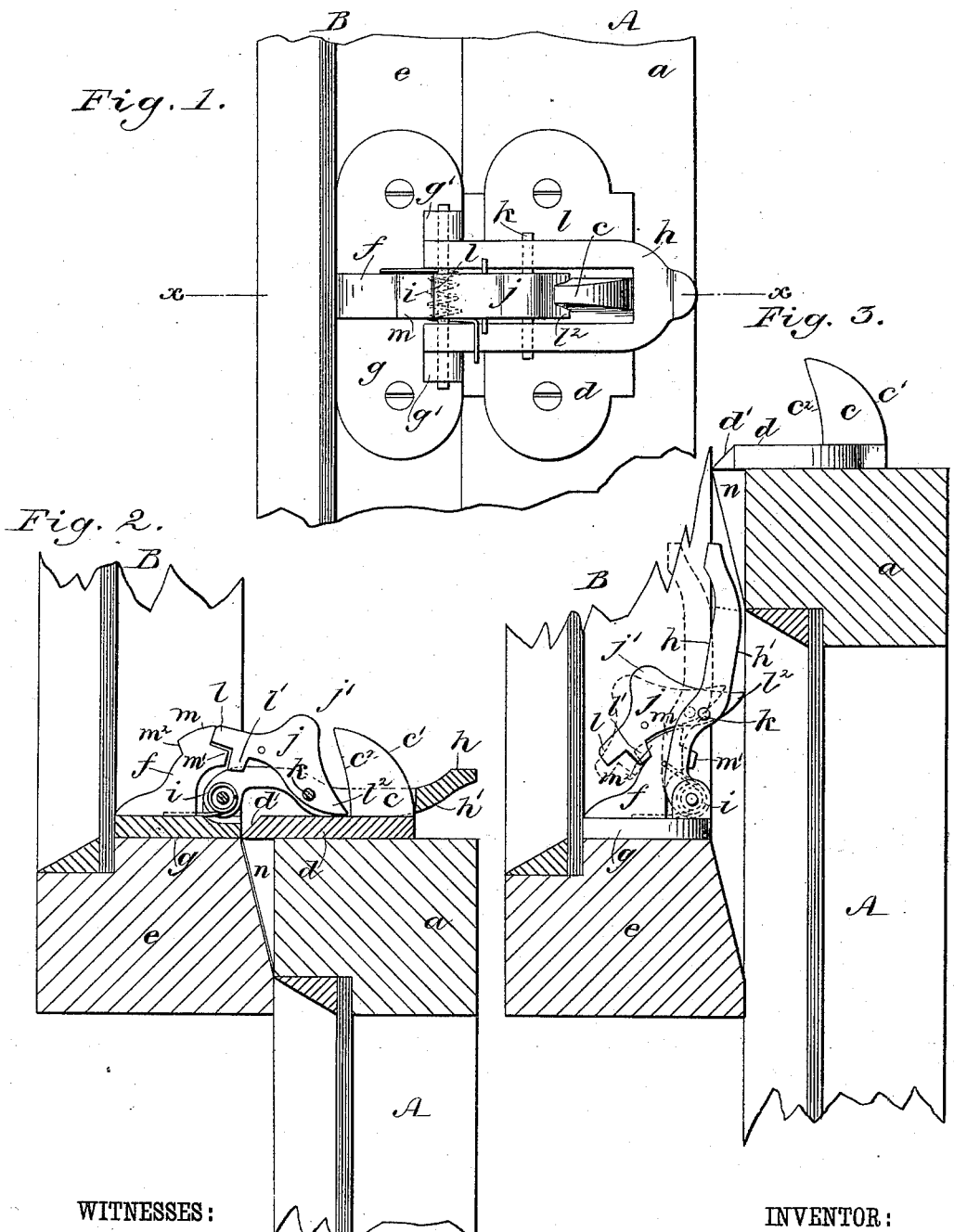
WITNESSES:
INVENTOR:
F. T. Davis
BY Munn & Co.
ATTORNEYS.

UNITED STATES PATENT OFFICE.

FRANKLIN T. DAVIS, OF MOUNT VERNON, NEW YORK.

SASH-FASTENER.

SPECIFICATION forming part of Letters Patent No. 331,041, dated November 24, 1885.

Application filed April 28, 1885. Serial No. 163,761. (Model.)

*To all whom it may concern:*

Be it known that I, FRANKLIN T. DAVIS, of Mount Vernon, in the county of Westchester and State of New York, have invented a new and Improved Sash-Fastener, of which the following is a full, clear, and exact description.

My invention relates to an improved window-sash fastener that acts automatically to lock the sash; and the invention consists of the construction, arrangement, and combination of parts, all as hereinafter described and claimed.

Reference is to be had to the accompanying drawings, forming part of this specification, in which similar letters of reference indicate corresponding parts in all the figures.

Figure 1 is a plan view of my new and improved sash-fastener as it appears applied to the window-sash and locked. Fig. 2 is a sectional elevation of the same, taken on the line $x\ x$ of Fig. 1; and Fig. 3 is a similar view showing the fastener unlocked and the sash partly open.

To the upper surface of the upper bar, $a$, of the lower sash, A, of the window is attached the upwardly-projecting horn, $c$. This is attached to or made a part of the bed-plate $d$, and it is outwardly curved or made convex at its outer edge, as shown at $c'$, and concaved at its inner edge, as shown at $c^2$, and the curves are so formed that the horn comes to a point at its upper end. The inner edge of the bed-plate $d$ is formed with the lip $d'$, for the purposes hereinafter mentioned. Upon the upper surface of the lower bar, $e$, of the upper sash, B, is secured the locking-stud $f$, which is attached to or made a part of the bed-plate $g$. In front of the stud $f$ is pivoted to the bed-plate $g$ in the lugs $g'\ g'$ the locking hasp or link $h$, which is acted upon by the spring $i$, that is arranged to normally hold the hasp or link $h$ in horizontal position to engage with the horn $c$ for locking the sashes A B together, and for drawing them together, the hasp or link $h$ acting for the latter purpose over the curved outer edge, $c'$, of the horn $c$, as will be understood from Fig. 2.

$j$ represents a locking-dog pivoted in the hasp or link $h$ upon the pin $k$, to act in connection with the stud $f$, for locking the sashes A from being raised and sash B from being lowered. The dog $j$ is formed at one end with the projections $l\ l'$ to engage with the corresponding projections, $m\ m'$, of the stud $f$. At its other end the dog is formed with the toe $l^2$, which serves two purposes: first, to rest upon the bed-plate $d$ when locked to relieve the pin $k$ of excessive strain, and, secondly, for tripping the lock when the sashes are closed, as hereinafter described. The dog $j$ is also formed at its upper edge with the finger-piece $j'$, for turning the dog backward on its pivot $k$ for disengaging the dog from the locking-stud $f$. The stud $f$, besides being formed with the studs $m\ m'$, is formed also with the shoulder $m^2$ at its rear surface, with which the projection $l'$ of the dog $j$ is adapted to engage for holding the hasp or link $h$ in unlocked or vertical position, as shown in Fig. 3. The hasp or link $h$ is formed at its lower or inner edge with the curve $h'$, against which the inner edge of the bar $a$ of the lower sash, A, strikes when the sash is lowered past the link or hasp, so that it will force the hasp and the dog $j$ slightly backward against the tension of spring $i$ to the position shown in dotted lines in Fig. 3, to separate the projection $l'$ from the shoulder $m^2$, so that there will not be unnecessary friction between the dog $j$ and stud $f$ at the time of closing the window. The toe $l^2$ of the locking-dog $j$, when the hasp or link $h$ and dog are held in the position shown in Fig. 3, stands in front of the curved surface $h'$ of the hasp $h$ and in line with the lip $d'$ of the bed-plate $d$, as shown clearly in said Fig. 3, so that in closing the sash, when the lip $d'$ strikes the toe $l^2$ it will turn the dog $j$ on its pivot $k$ and detach it from the shoulder $m^2$ of the stud $f$. This permits the spring $i$ to force the hasp $h$ and dog $j$ forward, so that the hasp will drop over horn $c$ and the dog $j$ into engagement with locking-stud $f$, and thus automatically lock the sashes. To unlock the sashes, the dog $j$ must be turned backward upon its pivot $k$, and the hasp or link $h$ raised at the same time, and the hasp must be turned backward on its pivot to engage dog $j$ with the stud $m^2$ of the locking-stud $f$, where it will be held, as shown in Fig. 3. A slight recess, $n$, is cut in the inner edge of the upper bar, $a$, of the lower sash, A, to form a clearance for the toe $l^2$ of the locking-dog $j$, so that it will not be operated in closing the sash until the lip $d'$ reaches the toe $l^2$. In case the sash is not entirely closed the projection $l'$ of the dog $j$ will engage with the upper projection, $m$, of the locking-stud $f$, and still effectually lock the sash, so the lock is very effective and reliable, and requires no attention in locking the window.

Having thus described my invention, what I claim as new, and desire to secure by Letters Patent, is—

1. The sash-lock herein shown and described, which consists of the horn $c$, and lip $d'$, attached to the lower sash, the locking-stud $f$, attached to the upper sash, in combination with the link or hasp $h$, and locking-dog $j$, pivoted therein, substantially as set forth.

2. The stud $f$, formed with shoulder $m^2$, in combination with hasp $h$ and locking-dog $j$, formed with stud $l'$ for holding the hasp and dog in vertical position, substantially as described.

3. The hasp $h$, formed with curve $h'$, in combination with dog $j$, having projection $l'$, and stud $f$, having shoulder $m^2$, substantially as and for the purposes set forth.

4. The locking-stud $f$, formed with projections $m\ m'$, in combination with the hasp $h$, and dog $j$, pivoted therein and formed with projections $l\ l'$, substantially as and for the purposes set forth.

5. The combination, with the plate $g$, having locking-stud $f$, and jaws $g'$, of the hasp $h$, dog $j$, and spring $i$, as set forth.

FRANKLIN T. DAVIS.

Witnesses:
WM. W. HINE,
BURR DAVIS.